United States Patent
Nagasaki et al.

(10) Patent No.: US 9,732,863 B2
(45) Date of Patent: Aug. 15, 2017

(54) FLUID CONTROL VALVE

(71) Applicant: DENSO CORPORATION, Kariya, Aichi-pref. (JP)

(72) Inventors: Kanehisa Nagasaki, Handa (JP); Kazuhiro Sasao, Chiryu (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 14/627,726

(22) Filed: Feb. 20, 2015

(65) Prior Publication Data

US 2015/0252908 A1     Sep. 10, 2015

(30) Foreign Application Priority Data

Mar. 4, 2014   (JP) .................................. 2014-41899

(51) Int. Cl.
| | |
|---|---|
| *F16K 11/07* | (2006.01) |
| *F16K 47/08* | (2006.01) |
| *F16K 31/06* | (2006.01) |

(52) U.S. Cl.
CPC ...... *F16K 11/0708* (2013.01); *F16K 31/0613* (2013.01); *F16K 47/08* (2013.01); *Y10T 137/8671* (2015.04)

(58) Field of Classification Search
CPC ........... F15B 13/0402; Y10T 137/8671; Y10T 137/86574; Y10T 137/86622; Y10T 137/8667; Y10T 137/86694; F16K 11/0708; F16K 11/0712; F16K 31/0613; F16K 47/08
USPC .............. 137/625.69, 625.2, 625.65, 625.67
See application file for complete search history.

(56) References Cited

U.S. PATENT DOCUMENTS

| | | | |
|---|---|---|---|
| 4,220,178 A | | 9/1980 | Jackson |
| 4,941,508 A | * | 7/1990 | Hennessy ........... F16K 11/0708 137/596.13 |
| 7,921,879 B2 | * | 4/2011 | Eschweiler ......... F15B 13/0402 137/625.68 |

(Continued)

FOREIGN PATENT DOCUMENTS

| | | |
|---|---|---|
| JP | 60-99365 | 7/1985 |
| JP | 60-125471 | 7/1985 |
| JP | 10-132096 | 5/1998 |

(Continued)

OTHER PUBLICATIONS

Office Action (2 pages) dated Mar. 1, 2016, issued in corresponding Japanese Application No. 2014-041899 and English translation (3 pages).

*Primary Examiner* — Kevin Murphy
*Assistant Examiner* — Kelsey Rohman
(74) *Attorney, Agent, or Firm* — Nixon & Vanderhye P.C.

(57) ABSTRACT

An end of a first land has a step difference recessing inward of a radial direction of the first land from the edge portion. The step difference has an end point opposite to the edge portion. A throttle portion protrudes from the start point in an axial direction, and includes an outer-peripheral corner (protrusion round portion) having a curved surface protruding in the axial direction and in the radial direction. When an inlet opening starts to be slightly opened, since a hydraulic fluid is throttled when flowing through a second gate opened between a corner of a sleeve and the protrusion round portion, a rapid increasing of a flow quantity of the hydraulic fluid and an instability of a control of the hydraulic fluid can be suppressed.

11 Claims, 9 Drawing Sheets

(56) References Cited

U.S. PATENT DOCUMENTS

2013/0048112 A1* 2/2013 Nemoto ............. F16K 31/0613
  137/544

FOREIGN PATENT DOCUMENTS

| JP | 2002-130515 | 5/2002 |
| JP | 3847486 | 9/2006 |
| JP | 2011-236964 | 11/2011 |
| JP | 2012-255508 | 12/2012 |

* cited by examiner

VALVE-CLOSING DIRECTION ⟷ VALVE-OPENING DIRECTION

—PRIOR ART—

--PRIOR ART--

FLUID CONTROL VALVE

CROSS REFERENCE TO RELATED APPLICATION

This application is based on Japanese Patent Application No. 2014-41899 filed on Mar. 4, 2014, the disclosure of which is incorporated herein by reference.

TECHNICAL FIELD

The present disclosure relates to a fluid control valve which drives a spool accommodated in a cylindrical sleeve in a shaft direction and controls an inflow and outflow of a hydraulic fluid.

BACKGROUND

Conventionally, it is well-known that a hydraulic control valve adjusts a pressure of an operating fluid (hydraulic oil) according to a movement of a spool. As shown in FIG. 12, the hydraulic control valve includes a sleeve 110 having a spool hole 100, and a spool 120 inserted into the spool hole 100 and being slidable relative to the sleeve 110 in an axial direction of the sleeve 110. The axial direction of the sleeve 110 is parallel to a valve-closing direction and a valve-opening direction as shown in FIG. 12. The sleeve 110 is provided with plural hydraulic ports including an inlet port 130 and an outlet port 140. A communication between the inlet port 130 and the outlet port 140 is allowed or interrupted according to a movement of the spool 120.

When the spool 120 is moved in the valve-opening direction to open the inlet port 130, an opening of the inlet port 130 is slightly opened that an opening quantity of the inlet port 130 changes from zero to a positive value. In this case, as shown in FIG. 13, a flow quantity of the hydraulic fluid indicated by a solid line and a fluid force of the hydraulic fluid in the axial direction indicated by a dotted line are sharply increased. Therefore, a variation of the hydraulic fluid is generated, and a control of the hydraulic fluid becomes unstable. The fluid force is a pressure of the hydraulic fluid which disturbs the movement of the spool 120 in a case where the spool 120 is moved in the valve-opening direction.

According to JP-60-125471A, a notch shaped portion or a tilted shaped portion starting from an edge portion is provided on an entire periphery of the edge portion, so as to suppress the variation of the hydraulic fluid at a time point that the opening of the inlet port 130 is slightly opened. The edge portion is a hydraulic dividing portion of the spool 120.

According to JP-2012-255508A, a straight step shaped portion is provided at a position right downstream of an edge portion.

However, when a solenoid is used as an actuator driving the spool 120, a control stroke of the solenoid is limited. In other words, a movable range of a plunger that is a stroke range of the spool 120 is limited. When the notch shaped portion, the tilted shaped portion, or the straight step shaped portion is provided in the stroke range, an opening width of the inlet port 130 opened by the spool 120 is insufficient. The opening width is referred to as a fully open stroke. As shown in FIG. 14, since a maximum flow quantity of the hydraulic fluid of when the inlet port 130 is opened to the fully open stroke becomes smaller, a required flow performance is deteriorated. It is possible that the fully open stroke becomes larger by increasing in size of a magnetic circuit portion of the solenoid to increase a control stroke. However, in this case, since the hydraulic control valve is increased in size, a mountability is deteriorated.

As a dotted line shown in FIG. 14, in an opening area exceeding the notch shaped portion, the tilted shaped portion, or the straight step shaped portion, since an injection flow of the hydraulic fluid flowing into the inlet port 130 flows in a direction toward the axial direction, the fluid force negatively affects a stability of an action of the hydraulic control valve.

SUMMARY

The present disclosure is made in view of the above matters, and it is an object of the present disclosure to provide a fluid control valve in which a variation of a hydraulic fluid generated in a case where an inlet port is slightly opened can be suppressed, and a required flow performance can be obtained in a case where an opening area of the input port becomes a fully open stroke.

According to an aspect of the present disclosure, the fluid control valve includes a sleeve and a spool. The sleeve has a spool hole. The spool is inserted into the spool hole and is slidable relative to the sleeve in an axial direction of the sleeve. The sleeve includes an inlet port and an outlet port which are communicating with the spool hole. The spool includes a first land, a second land, and a shaft portion. The first land and the second land are slidable relative to an inner peripheral surface of the sleeve. The shaft portion is connected with both the first land and the second land in the axial direction. The inlet port has an inlet opening opened at the inner peripheral surface of the sleeve. When the first land opens the inlet opening according to a movement of the spool, a communication state between the inlet port and the outlet port is allowed. An outer-peripheral corner of the first land opening and closing the inlet opening is referred to as an edge portion. The first land opposite to the second land via the shaft portion in the axial direction includes a first end having a step difference recessing inward of a radial direction of the first land from the edge portion. The step difference has an end point opposite to the edge portion. A throttle portion protrudes from the start point in the axial direction. The throttle portion includes an outer-peripheral corner having a curved surface protruding in the axial direction and in the radial direction.

According to the above configuration, a rapid increasing of a flow quantity of the hydraulic fluid can be suppressed in a case where the first land starts to open the inlet port that the inlet port is slightly opened. When the inlet port is slightly opened, since the injection flow collides with the curved surface of the throttle portion at a substantially right angle, an energy of the injection flows becomes smaller. Further, since an opening area opened in the radial direction between the curved surface of the throttle portion and the inlet port, the rapid increasing of the flow quantity of the hydraulic fluid can be suppressed. Then a flow rate of the injection flow becomes slower. Since the injection flow flows inwardly in a direction along the curved surface of the throttle portion, a fluid force generated in the axial direction is decreased. Thus, a generation of the variation of the hydraulic fluid is suppressed, and a stability of a control of the hydraulic fluid is improved.

Since the throttle portion includes the outer-peripheral corner having a curved surface protruding in the axial direction and in the radial direction, a gap between the inlet port and the curved surface increases in accordance with an increase in opening area of the inlet port. In other words, a throttling effect of the throttle portion relative to the flow quantity is decreased in accordance with an increase in opening area of the inlet port in a case where the inlet port is slightly opened. Thus, when the opening area of the inlet port becomes the fully open stroke, a required maximum flow-quantity performance can be ensured without decreasing the flow quantity of the hydraulic fluid. In other words, since the flow quantity of the hydraulic fluid is not decreased in a case where the opening area of the inlet port becomes the fully open stroke even though the throttle portion is provided on a first end of the first land, it is unnecessary to increase a stroke range of the spool to ensure the required maximum flow-quantity performance.

Even when the flow quantity of the hydraulic fluid is large, since the injection flow flows inwardly in a direction along the curved surface, the fluid force generated in the axial direction is decreased. Thus, a control driving force cancelling the fluid force can be decreased, and the fluid control value can be miniaturized.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
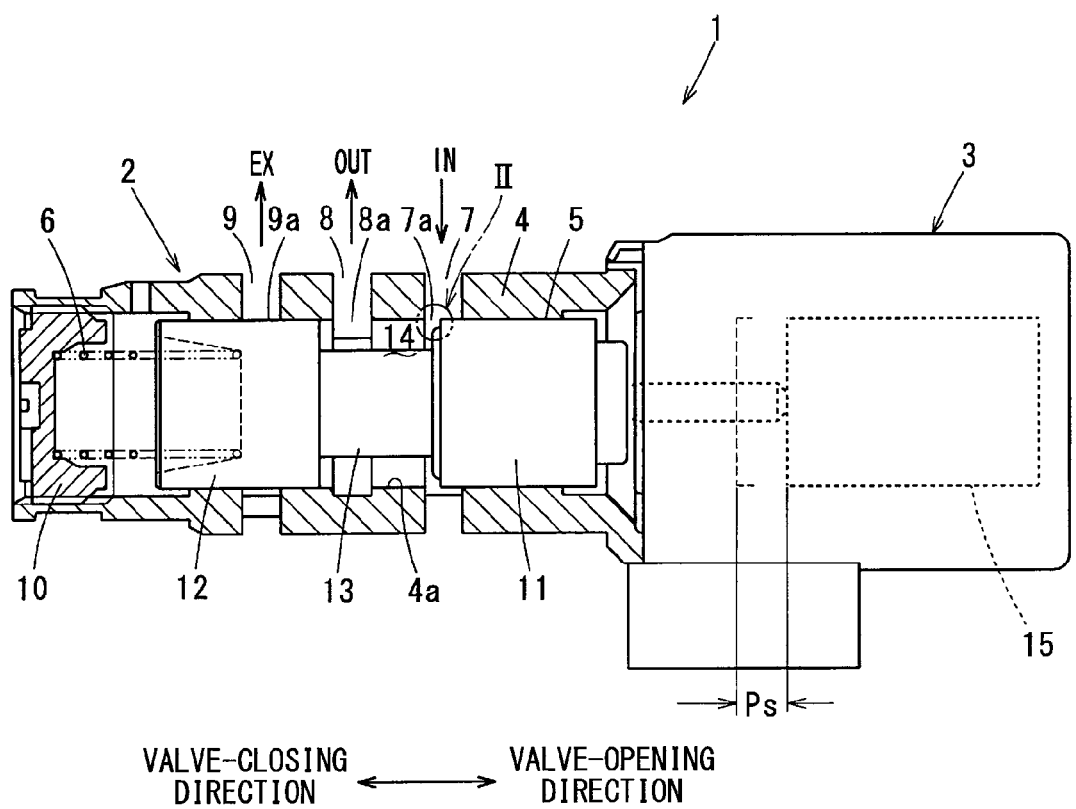
FIG. 1 is a sectional diagram showing a hydraulic control valve according to a first embodiment of the present disclosure.
Figure 2:
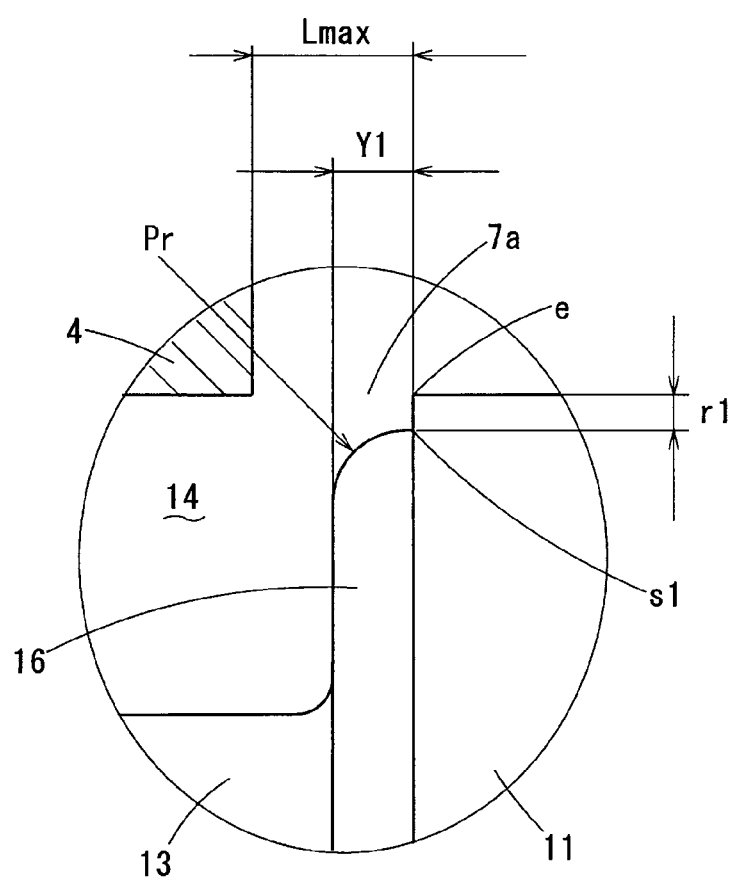
FIG. 2 is an enlarged view showing an area II of FIG. 1.
Figure 3:
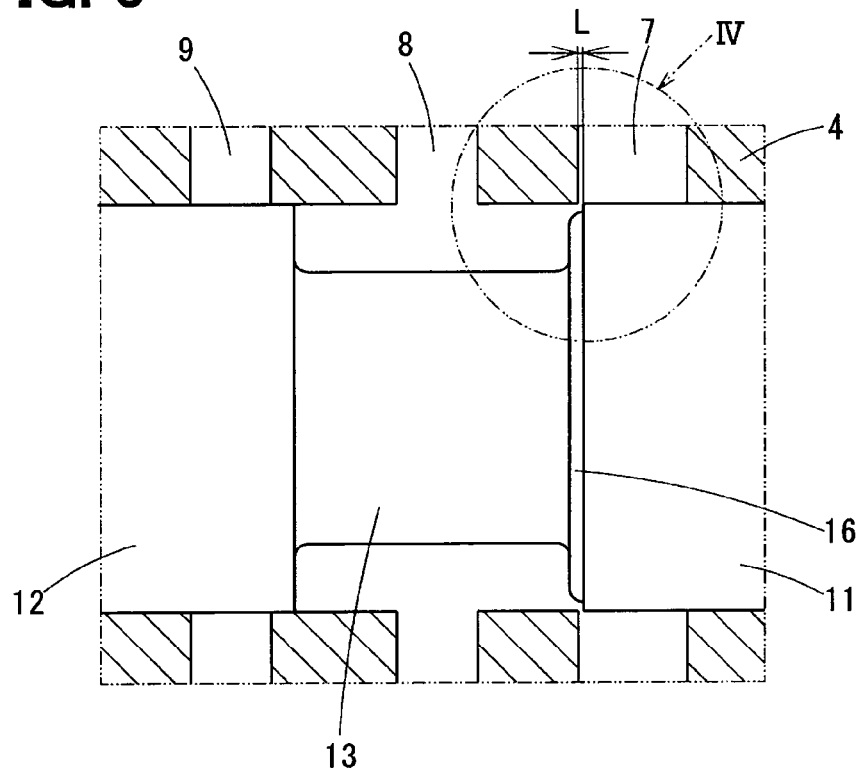
FIG. 3 is a sectional diagram showing a part of the hydraulic control valve which is slightly opened.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be detailed.

[First Embodiment]

According to a first embodiment of the present disclosure, a fluid control valve used as a hydraulic control valve will be described.

As shown in FIG. 1, the hydraulic control valve 1 is provided in a hydraulic circuit of an auto transmission mounted to an automobile, and includes a spool valve 2 and a solenoid 3.

The spool valve 2 includes a sleeve 4, a spool 5, and a spring 6. The sleeve 4 has a spool hole 4a. The spool 5 is inserted into the spool hole 4a and is slidable relative to the sleeve 4 in a longitude direction of the sleeve 4. The spring 6 biases the spool 5 in a valve-opening direction. Hereafter, the longitude direction of the sleeve 4 is referred to as an axial direction.

The sleeve 4 is a tubular shape, and both ends of the spool hole 4a is open. The sleeve 4 is provided with plural hydraulic ports 7, 8, and 9 which penetrate a wall of the sleeve 4 in a radial direction of the sleeve 4. The hydraulic ports 7, 8, and 9 communicate with the spool hole 4a. In addition, the radial direction of the sleeve 4 crosses the axial direction at right angles. The hydraulic ports 7, 8, and 9 include an inlet port 7, an outlet port 8, and a drain port 9. The inlet port 7 is connected with a hydraulic supplier such as a hydraulic pump. The outlet port 8 is connected with a hydraulic supplied member that receives a hydraulic fluid. The drain port 9 drains the hydraulic fluid to a low-pressure area including an oil pan. According to the first embodiment, the outlet port 8 is disposed at a position between the inlet port 7 and the drain port 9 in the axial direction of the sleeve 4.

A first end of the sleeve 4 in the axial direction is threaded with a plug 10. In other words, the plug 10 covers an opening of the spool hole 4a in the axial direction. The spring 6 is disposed at a position between the plug 10 and the spool 5. A load of the spring 6 can be adjusted according to a threaded quantity of the plug 10 relative to the sleeve 4.

The spool 5 includes a first land 11, a second land 12, and a shaft portion 13. The first land 11 and the second land 12 are slidable relative to an inner peripheral surface of the sleeve 4. The shaft portion 13 is connected with both the first land 11 and the second land 12 in the axial direction.

The first land 11 is disposed at a position farther from the plug 10 in the axial direction than the shaft portion 13 is. The first land 11 can open and close an inlet opening 7a of the inlet port 7 which is opened at the inner peripheral surface of the sleeve 4. When the first land 11 opens the inlet opening 7a, the spool 5 is moved in the valve-opening direction. When the first land 11 closes the inlet opening 7a, the spool 5 is moved in a valve-closing direction.

The second land 12 is disposed at a position closer to the plug 10 in the axial direction than the shaft portion 13 is. The second land 12 can open and close a drain opening 9a of the drain port 9 which is opened at the inner peripheral surface of the sleeve 4.

The shaft portion 13 has a diameter less than an outer diameter of the first land 11 and an outer diameter of the second land 12. The inner peripheral surface of the sleeve 4 and an outer peripheral surface of the shaft portion 13 define a space that is a ring shape. In this case, the space is referred to as an oil-pressure switching chamber 14. In addition, an outlet opening 8a of the outlet port 8 which is opened at the inner peripheral surface of the sleeve 4 always communicates with the oil-pressure switching chamber 14.

The solenoid 3 is disposed at a position adjacent to a second end of the sleeve 4 in the axial direction. In other words, the solenoid 3 is disposed at a position farther from the plug 10 in the axial direction than the sleeve 4 is. The solenoid 3 functions as an electromagnet when an internal coil (not shown) is energized, and a plunger 15 is attracted by the electromagnet and moved in the valve-opening direction. In this case, the spool 5 biased by the spring 6 is moved in the valve-opening direction. Further, since the first land 11 opens the inlet opening 7a, the inlet port 7 communicates with the outlet port 8 via the oil-pressure switching chamber 14 therebetween. In other words, a communication state between the inlet port 7 and the outlet port 8 is allowed. Furthermore, since the second land 12 closes the drain opening 9a, a communication state between the outlet port 8 and the drain port 9 is interrupted.

When the internal coil is deenergized, the plunger 15 is biased by a return spring (not shown) and moved in the valve-closing direction. In this case, the spool 5 is moved in the valve-closing direction by cancelling a biasing force of the spring 6. Further, since the first land 11 closes the inlet opening 7a, the communication state between the inlet port 7 and the outlet port 8 is interrupted. Furthermore, since the second land 12 opens the drain opening 9a, the outlet port 8 communicates with the drain port 9 via the oil-pressure switching chamber 14 therebetween. In other words, the communication state between the outlet port 8 and the drain port 9 is allowed.

An outer-peripheral corner of the first land 11 of when the spool 5 is moved in the valve-opening direction to start to open the inlet opening 7a is referred to as an edge portion e. The edge portion e is a right angle. A first end of the first land 11 in the axial direction includes a throttle portion 16 having a step difference r1 recessing inward of a radial direction of the first land 11 from the edge portion e. The throttle portion 16 protrudes from a start point s1 of the first end of the first land 11 in the axial direction. The start point s1 is an end point of the step difference r1 opposite to the edge portion e. An outer-peripheral corner of the throttle portion 16 has a curved surface protruding in the axial direction and in the radial direction. The curved surface may be a round curved surface having a constant curvature. Alternatively, a curvature of the curved surface is gradually varied from one end to the other end. Hereafter, the curved surface is referred to as a protrusion round portion (Pr).

It is preferable that a dimension of the step difference r1 is set to a value greater than a dimension of a mesh of a filter provided in the hydraulic circuit so as to prevent an entering of foreign matter in a case where the edge portion e closes the inlet opening 7a. For example, the dimension of the step difference may be set to be greater than 0.1 mm. Further, it is preferable that an upper limit of the dimension of the step difference r1 is set to be a value no more than 60% of a fully open stroke Lmax. The fully open stroke Lmax is a stroke that is fully opened. In other words, in this case, the inlet port 7 is fully opened to be in the fully open stroke Lmax.

The fully open stroke Lmax is determined according to a movable range Ps of the plunger 15 provided in the solenoid 3. That is, in the fully open stroke Lmax, the edge portion e of the first land 11 is a dimension of an opening of the inlet opening 7a in the axial direction.

It is preferable that a protrusion dimension Y1 of the throttle portion 16 is set to twice or less as large as the fully open stroke Lmax. The protrusion dimension Y1 is a height of the throttle portion 16. It is preferable that a lower limit of the height Y1 of the throttle portion 16 is set to a value exceeding 10% of the fully open stroke Lmax so as to suppress a rapid increasing of a flow quantity of the hydraulic fluid at a time point (ts) that the edge portion e starts to slightly open the inlet opening 7a.

Figure 4:
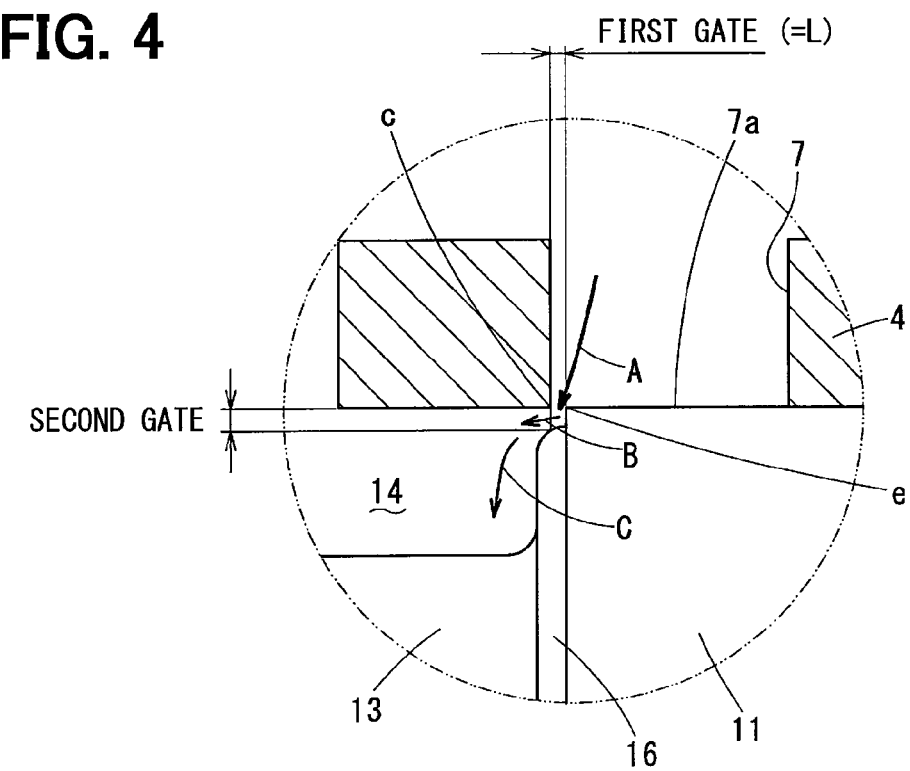
FIG. 4 is an enlarged view showing an area IV of FIG. 3.

According to the first embodiment, since the first end of the first land 11 is provided with the throttle portion 16 in the axial direction, the rapid increasing of the flow quantity of the hydraulic fluid at the time point that the edge portion e of the first land 11 starts to slightly open the inlet opening 7a can be suppressed. At the time point that the edge portion e starts to slightly open the inlet opening 7a, the height Y1 of the throttle portion 16 is less than a dimension of an opening stroke L. The opening stroke L is a dimension of an opening of the inlet opening 7a in the axial direction. In other words, as shown in FIG. 4, the opening stroke L is a distance between a corner c of the sleeve 4 and the edge portion e of the first land 11. The corner c defines a first opening end of the inlet opening 7a in the axial direction. An opening area opened in the axial direction between the corner c of the sleeve 4 and the edge portion e is referred to as a first gate.

Figure 6:
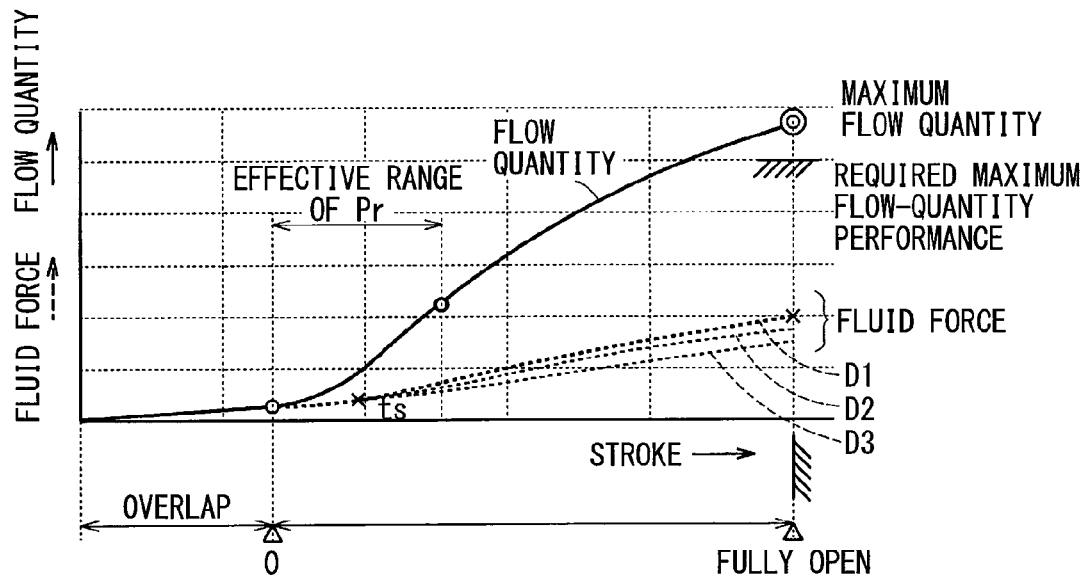
FIG. 6 is graph showing a flow characteristic of the hydraulic control valve.

As shown in FIG. 4, at the time point that the edge portion e starts to slightly open the inlet opening 7a, a flow of the hydraulic fluid flowing toward the first gate indicated by an arrow A is generated. When the flow A flows through the first gate, the flow A becomes an injection flow having a high flow rate. However, since the injection flow collides with the protrusion round portion at a substantially right angle, an energy of the injection flow is decreased. As an arrow B shown in FIG. 4, the injection flow flows through a second gate after colliding with the protrusion round portion. In this case, the second gate is an opening area opened in the radial direction between the corner c of the sleeve 4 and the protrusion round portion. However, as shown in FIG. 6, since a dimension of the second gate in the radial direction is small, the rapid increasing of the flow quantity of the hydraulic fluid at the time point that the edge portion e starts to slightly open the inlet opening 7a can be suppressed.

Then, since the injection flow flows inwardly in a direction along a surface of the protrusion round portion as an arrow C, a fluid force of the injection flow is decreased in the axial direction.

Since the protrusion round portion of the throttle portion 16 has the curved surface protruding in the axial direction and in the radial direction, the dimension of the second gate increases in accordance with an increase in opening stroke L at the time point that the edge portion e starts to slightly open the inlet opening 7a. Therefore, the flow quantity of the fluid increases substantially linearly relative to the increase of the opening stroke L.

Figure 5:
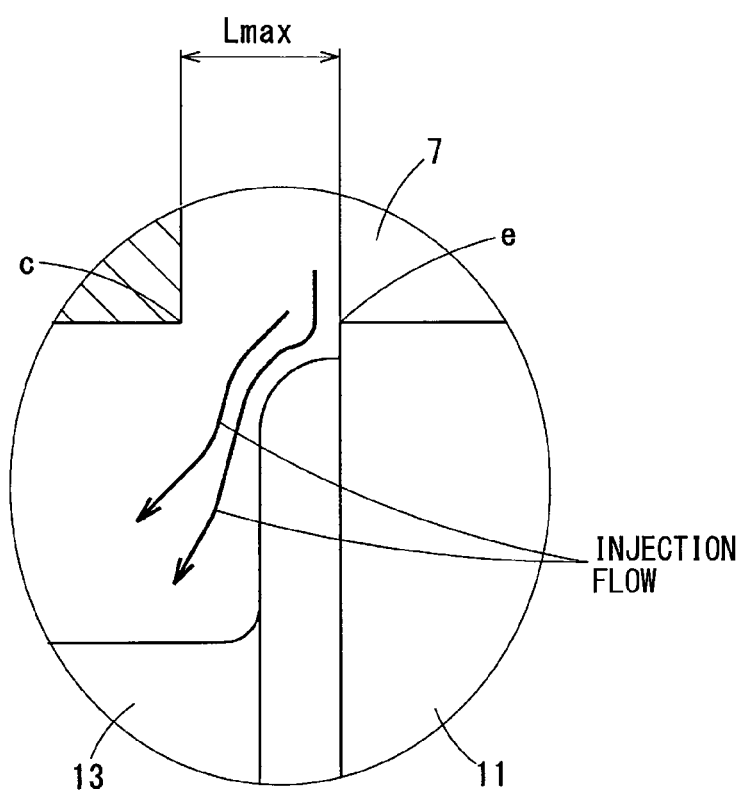
FIG. 5 is a sectional diagram showing a part of the hydraulic control valve in a case where the hydraulic control valve is in a fully open stroke.

As shown in FIG. 5, when the dimension of the first gate exceeds the fully open stroke Lmax after the time point that the edge portion e starts to slightly open the inlet opening 7a, since the throttle portion 16 is moved to a position separating from the corner c of the sleeve 4 in the valve-opening direction, the flow is not throttled by the second gate. As a solid line shown in FIG. 6, since the first end of the first land 11 is provided with the throttle portion 16 in the axial direction, a maximum flow quantity of when the opening stroke L becomes the fully open stroke Lmax is not decreased. Further, as a dotted line D1 shown in FIG. 6, the fluid force in the axial direction can be decreased.

As the above description, according to the first embodiment, the hydraulic control valve 1 can suppress the flow quantity of the hydraulic fluid at the time point that the edge portion e starts to slightly open the inlet opening 7*a* and can suppress a rapid increasing of the fluid force in the axial direction. Further, the fluid force according to the first embodiment is relatively less than the fluid force according to JP-60-125471A and JP-2012-255508A in a case where the quantities of the hydraulic fluids are the same.

Therefore, a generation of a variation of the hydraulic fluid is suppressed, and a stability of a control of the hydraulic fluid is improved. Since the hydraulic fluid is not throttled by the throttle portion 16 in a case where the opening stroke L becomes the fully open stroke Lmax, a required flow performance can be ensured. Thus, it is unnecessary that a size of a magnetic circuit of the solenoid is increased to increase a control stroke. Therefore, the hydraulic control valve 1 can be miniaturized.

As shown in FIG. 6, since both the a linearity of the flow quantity of the hydraulic fluid and a linearity of the fluid force in the axial direction relative to the opening stroke are improved, a flow characteristic which is linear relative to an energization quantity of the solenoid 3 can be obtained, and a saleability is improved.

Hereafter, other embodiments according to the present disclosure will be described.

The substantially same parts and the components as the first embodiment are indicated with the same reference numeral and the same description will not be reiterated.

[Second Embodiment]

Figure 7:
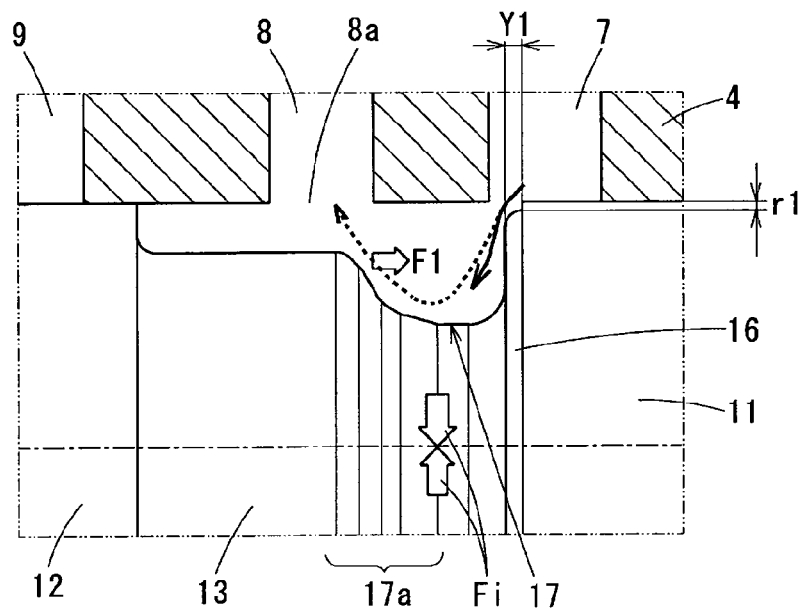
FIG. 7 is an enlarged view showing a part of the hydraulic control valve according to a second embodiment of the present disclosure.

According to a second embodiment of the present disclosure, as shown in FIG. 7, a narrow portion 17 is formed on an entire periphery of a second end of the shaft portion 13 connected to the first land 11.

The narrow portion 17 recesses inwardly in a direction along an end surface of the throttle portion 16. The end surface of the throttle portion 16 crosses the axial direction of the shaft portion 13 at right angles. The narrow portion 17 includes a depth-decreasing area 17*a* which has a depth decreasing from a position having a maximum depth toward a first end of the shaft portion 13 in the axial direction. The depth-decreasing area 17*a* has a surface curved or tilted toward the outlet opening 8*a* opened at the inner peripheral surface of the sleeve 4.

Since the narrow portion 17 is formed on the entire periphery of the shaft portion 13, the hydraulic fluid flowing through the first gate flows into the narrow portion 17 at the time point that the edge portion e starts to slightly open the inlet opening 7*a*. Therefore, a pressing force Fi is inwardly applied to the shaft portion 13 in the radial direction. As a dotted line shown in FIG. 7, the hydraulic fluid flowing into the narrow portion 17 becomes the injection flow flowing in a direction along the surface of the depth-decreasing area 17*a* toward the outlet opening 8*a*.

Figure 8:
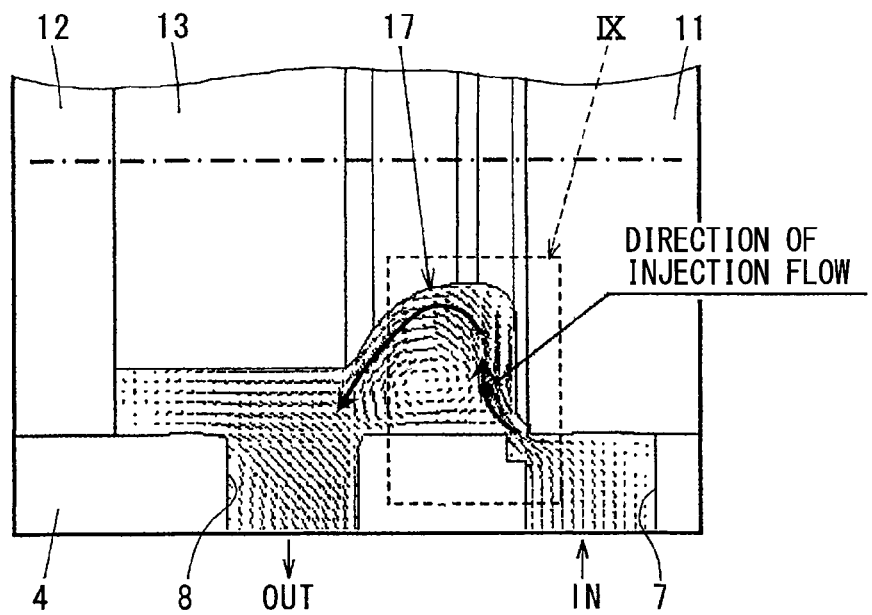
FIG. 8 is a diagram showing a flow-rate vector indicating an injection direction of a hydraulic fluid.

FIG. 8 is a diagram showing a flow-rate vector indicating a simulation result of the hydraulic fluid according to a computer aided engineering (CAE). The hydraulic fluid becomes the injection flow flowing in a direction along the surface of the depth-decreasing area 17*a* toward the outlet opening 8*a* of the outlet port 8 after the hydraulic fluid flowing through the first gate flows into the narrow portion 17.

Figure 9:
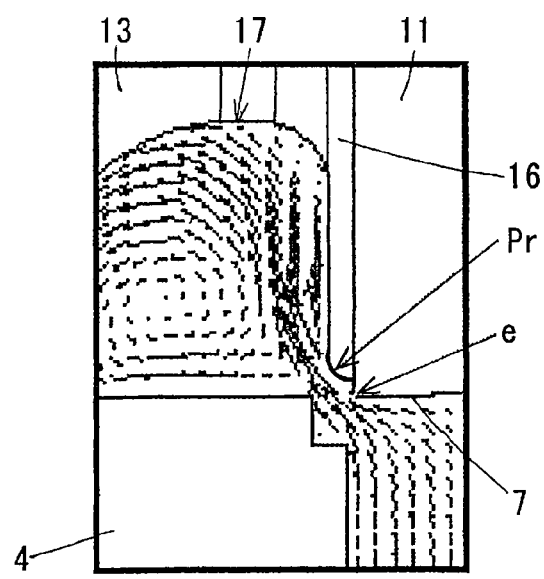
FIG. 9 is an enlarged view showing an area IX of FIG. 8.

As shown in FIG. 9, the hydraulic fluid flowing through the first gate becomes the injection flow flowing inwardly in a direction along a surface of the protrusion round portion, and then flows in a direction along the surface of the narrow portion 17. That is, the injection flow flowing in the axial direction is decreased. Since a pressure applied to the surface of the depth-decreasing area 17*a* is decreased according to a high flow rate of the injection flow flowing in a direction along the surface of the depth-decreasing area 17*a*, a first cancelling force F1 is generated to cancel the fluid force in the axial direction. According to the second embodiment, as a dotted line D2 shown in FIG. 6, the fluid force is less than the fluid force as the dotted line D1 according to the first embodiment.

[Third Embodiment]

Figure 10:
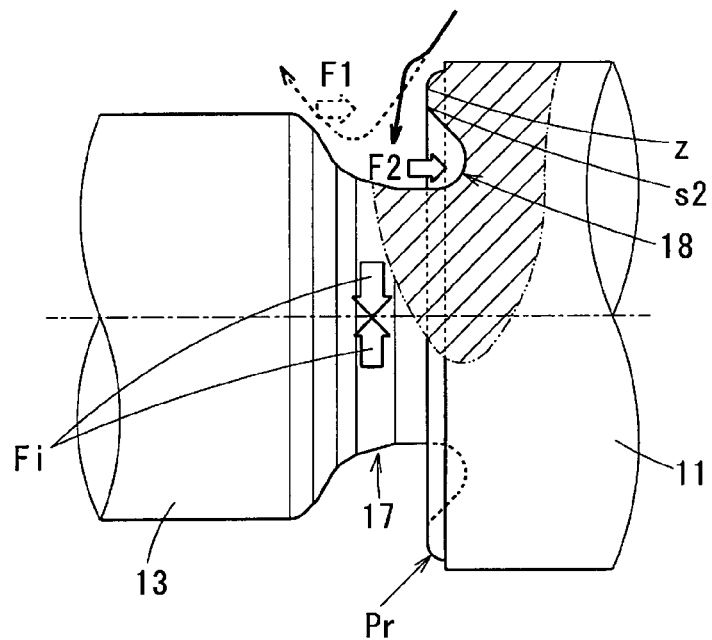
FIG. 10 is an enlarged view showing a part of an example of the hydraulic control valve according to a third embodiment of the present disclosure.

According to a third embodiment of the present disclosure, as shown in FIG. 10, a start point s2 is established on the surface of the throttle portion 16 inward of the protrusion round portion in the radial direction. The throttle portion 16 includes a recess portion 18 inwardly recessing from the start point s2 in the axial direction. In other words, the recess portion 18 recesses in the valve-opening direction from the start point s2.

According to the third embodiment, as a solid line shown in FIG. 10, the hydraulic fluid flowing through the first gate becomes the injection flow flows inwardly in a direction along the surface of the protrusion round portion, and the injection flow collides with the surface of the narrow portion 17. Since an energy of the collision between the injection flow and the surface of the narrow portion 17 is applied to a wall surface of the recess portion 18 in the axial direction to increase a pressure applied to the wall surface of the recess portion 18, a second cancelling force F2 is generated to cancel the fluid force in the axial direction.

According to the third embodiment, as a dotted line shown in FIG. 6, since the second cancelling force F2 is generated in addition of the first cancelling force F1, the fluid force is less than the fluid force according to the second embodiment.

Figure 11:
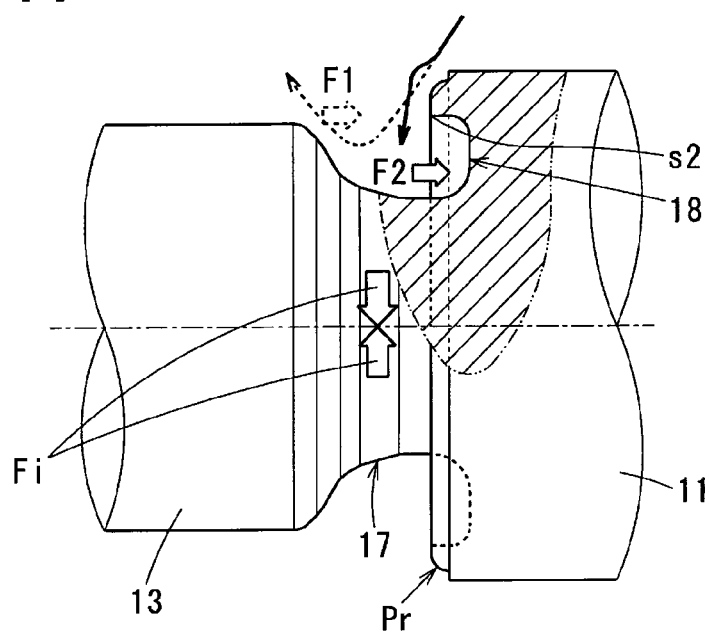
FIG. 11 is an enlarged view showing a part of another example of the hydraulic control valve according to the third embodiment.
Figure 12:
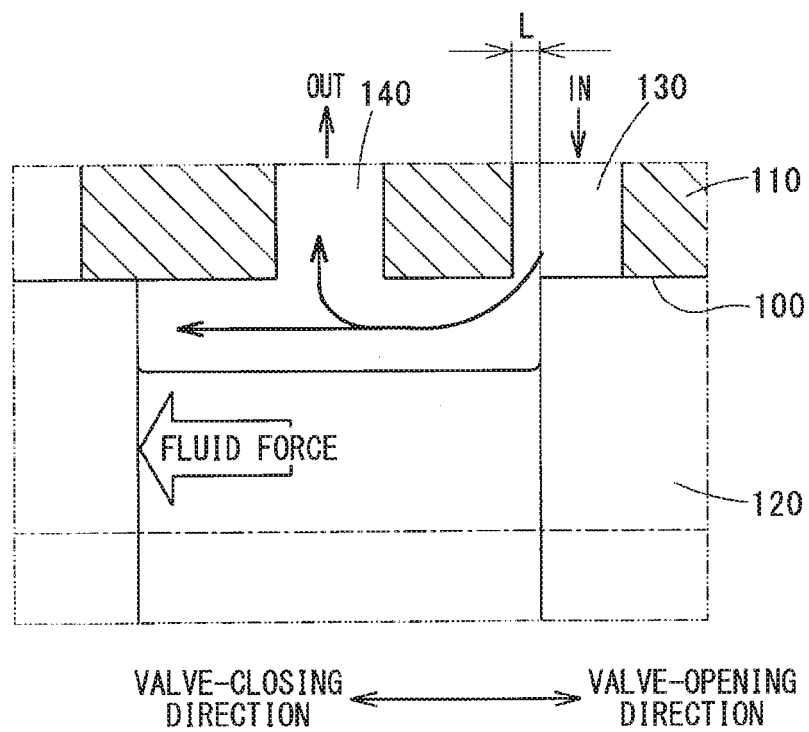
FIG. 12 is an enlarged view showing a part of a hydraulic control valve according to a conventional technology.
Figure 13:
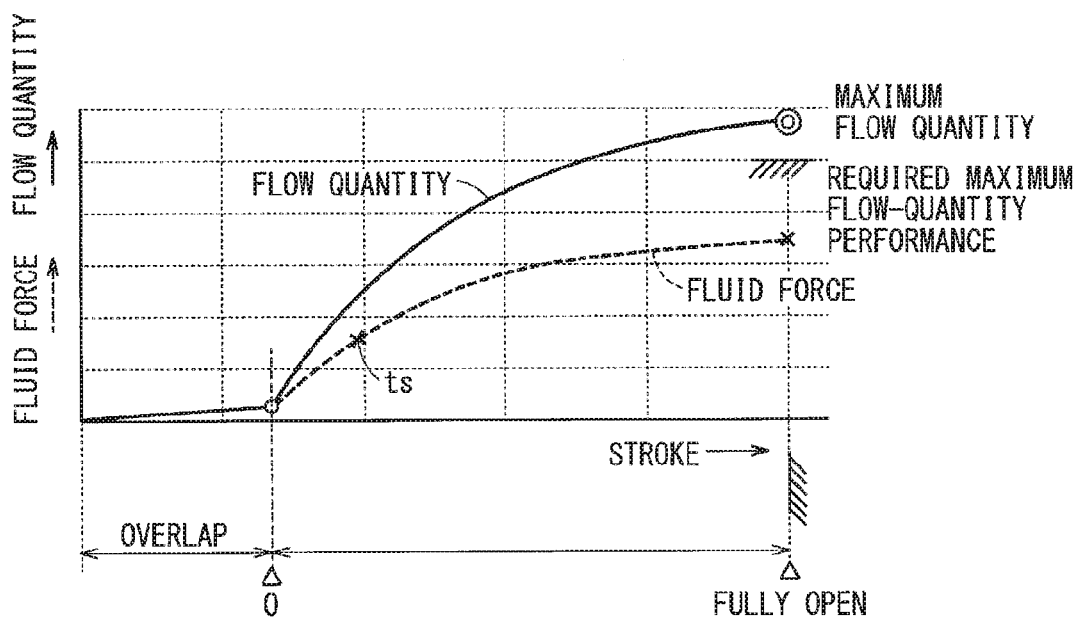
FIG. 13 is a graph showing a flow characteristic of the hydraulic control valve according to the conventional technology.
Figure 14:
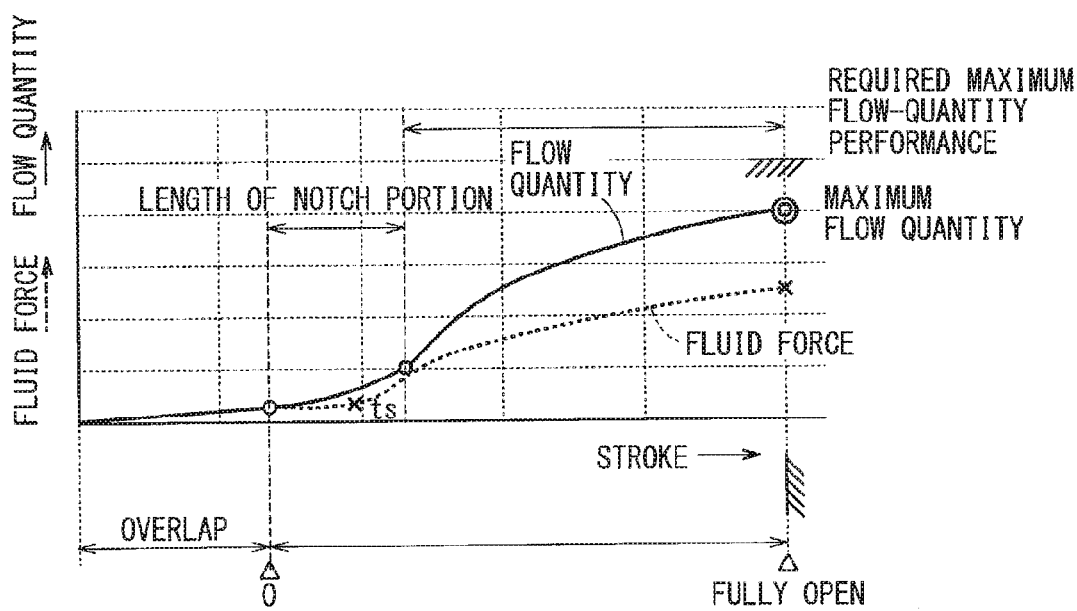
FIG. 14 is a graph showing the flow characteristic of the hydraulic control valve in a case where a variation due to a slight opening is suppressed, according to the conventional technology.

As shown in FIG. 10, the start point s2 is established on the surface of the throttle portion 16 inward of an end point z of the protrusion round portion in the radial direction. In this case, the recess portion 18 inwardly recesses from the start point s2 in the axial direction to have a tilted shape. Alternatively, as shown in FIG. 11, the start point s2 is established on the surface of the throttle portion 16 inward of the end point z of the protrusion round portion in the radial direction. In this case, the recess portion 18 recesses inwardly in the axial direction from the start point s2 to have a recessed shape. The axial direction is parallel to an axial center of the shaft portion 13.

As shown in FIGS. 10 and 11, the start point s2 is established on the surface of the throttle portion 16 inward of the end point z of the protrusion round portion in the radial direction. However, the end point z of the protrusion round portion can be set as the start point s2 of the recess portion 18. Alternatively, another point of the protrusion round portion may be set as the start point s2 of the recess portion 18. A direction of a tangential line of the end point z of the protrusion round portion crosses an axial center of the spool 5 at right angles.

[Other Embodiment]

According to the third embodiment, the recess portion 18 is provided based on a configuration of the second embodiment. However, the third embodiment may be applied to a configuration of the first embodiment where the narrow portion 17 is not provided on the shaft portion 13.

According to the first embodiment, the hydraulic control valve 1 uses the solenoid 3 as a driving power source to drive the spool 5. However, the hydraulic control valve 1 may use another driving power source using an oil pressure instead of the solenoid 3.

The present disclosure is not limited to the hydraulic control valve 1 of the first embodiment 1. For example, the present disclosure may be applied to a flow control valve or a flow-passage switching control valve.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fluid control valve comprising:
a sleeve defining a spool hole; and
a spool inserted into the spool hole and being slidable relative to the sleeve in an axial direction of the sleeve, wherein
the sleeve includes an inlet port and an outlet port which are communicating with the spool hole,
the spool includes a first land, a second land, and a shaft portion,
the first land and the second land are slidable relative to an inner peripheral surface of the sleeve,
the shaft portion is connected with both the first land and the second land in the axial direction,
the inlet port has an inlet opening opened at the inner peripheral surface of the sleeve, the inlet opening having a width that corresponds to a fully open stroke,
when the first land opens the inlet opening according to a movement of the spool, the inlet port communicates with the outlet port,
an outer-peripheral corner of the first land opening and closing the inlet opening is an edge portion,
the first land opposite to the second land via the shaft portion in the axial direction includes, a throttle portion having an approximately vertical surface distant, from the edge portion by a first predetermined distance in the axial direction,
a start point is at a position of the first land distant from the edge portion by a second predetermined distance inward in a radial direction of the first land,
the throttle portion has a curved surface that protrudes from the start point in both the axial direction and the radial direction and is smoothly connected with the approximately vertical surface, and
the second predetermined distance is greater than or equal to 0.1 mm and is less than or equal to 60% of the fully open stroke,
wherein the throttle portion has a start point that is set on the surface of the throttle portion inward of the start point of the curved surface, and
the throttle portion includes a recess portion inwardly recessing from the start point of the throttle portion in the axial direction.

2. The fluid control valve according to claim 1, wherein the spool further includes a narrow portion disposed on an entire periphery of a second end of the shaft portion connected to the first land,
the narrow portion includes a depth-decreasing area which has a depth decreasing from a position having a maximum depth toward a first end of the shaft portion in the axial direction, the outlet port has an outlet opening opened at an inner peripheral surface of the sleeve, and
the depth-decreasing area has a surface curved or tilted toward the outlet opening.

3. The fluid control valve according to claim 1, wherein the edge portion is arranged between the inlet port and the outlet port.

4. The fluid control valve according to claim 1, wherein the sleeve further includes a drain port, and
the second land opens and closes a drain opening of the drain port.

5. The fluid control valve according to claim 4, wherein the shaft portion slides between the inlet port and the drain port.

6. The fluid control valve according to claim 1, wherein the curved surface of the throttle portion has a constant curvature.

7. The fluid control valve according to claim 1, wherein the throttle portion has a portion with curved surface having a curvature and has portion with a straight surface that does not have a curvature.

8. The fluid control valve according to claim 1 further comprising
a mesh filter through which hydraulic fluid passes,
wherein the mesh filter has a mesh size in a linear dimension and
a dimension of the second predetermined distance is greater than the dimension of the mesh size.

9. The fluid control valve according to claim 1, wherein the curved surface of the throttle portion protruding in the axial direction and in the radial direction has a protrusion dimension that is twice or less as large as a linear distance of the movement of the spool corresponding to a fully open stroke.

10. The fluid control valve according to claim 1, wherein the curved surface of the throttle portion protruding in the axial direction and in the radial direction has a protrusion dimension that is greater than 10% of a linear distance of the movement of the spool corresponding to a fully open stroke.

11. The fluid control valve according to claim 1, wherein the throttle portion has a round surface.

* * * * *